United States Patent [19]
Callahan

[11] Patent Number: 6,086,284
[45] Date of Patent: Jul. 11, 2000

[54] LOCKING HUB

[76] Inventor: Peter Callahan, 25 Everett St., Concord, Mass. 01742

[21] Appl. No.: 09/048,863

[22] Filed: Mar. 26, 1998

[51] Int. Cl.⁷ .................................................. F16C 11/10
[52] U.S. Cl. .............................. 403/93; 403/97; 403/103; 403/84
[58] Field of Search ................................. 403/92, 93, 97, 403/83, 84, 103, 104; 16/326, 328, 334

[56] References Cited

U.S. PATENT DOCUMENTS

| | | | |
|---|---|---|---|
| 2,594,227 | 4/1952 | Smith | 403/84 X |
| 4,666,328 | 5/1987 | Ryu | 403/92 |
| 4,770,559 | 9/1988 | Yoo | 403/93 |
| 5,056,805 | 10/1991 | Wang | 403/93 X |
| 5,062,179 | 11/1991 | Huang | 403/93 X |
| 5,123,768 | 6/1992 | Franklin | 403/97 X |
| 5,520,474 | 5/1996 | Liu | 403/97 |

*Primary Examiner*—Lynne H. Browne
*Assistant Examiner*—John Cottingham
*Attorney, Agent, or Firm*—Timothy J. Shea, II, Esq.

[57] ABSTRACT

A lockable hub device having a base that accommodates about a central axis a ganged pair of lockable attachment rings, a corresponding pair of locking and release elements, and a top cap, the entire assembly being secured by means of an assembly element that engages both the base and the top cap. The articulating members to be adjusted, e.g., the legs of a table or other foldable device, are attached to one of the lockable attachment rings. For simplicity of use, it is intended that each of the locking and release elements be constructed to extend partly through lumens defined by the top cap such that they may lockably engage the cap while retaining their partial extension therethrough, and such that release of each element may be achieved in a similar fashion as the locking operation.

10 Claims, 9 Drawing Sheets

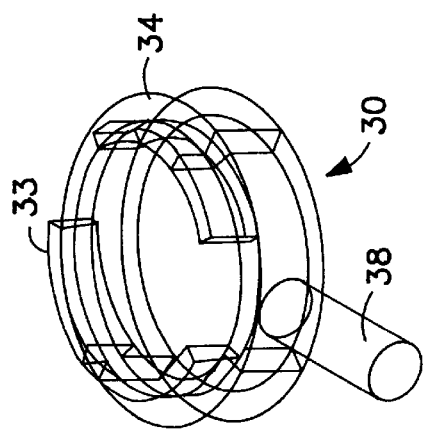
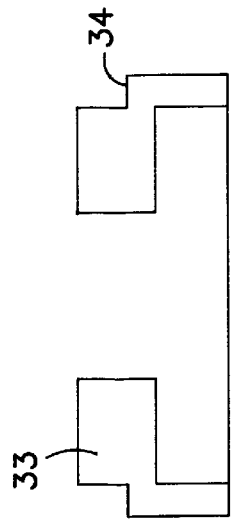
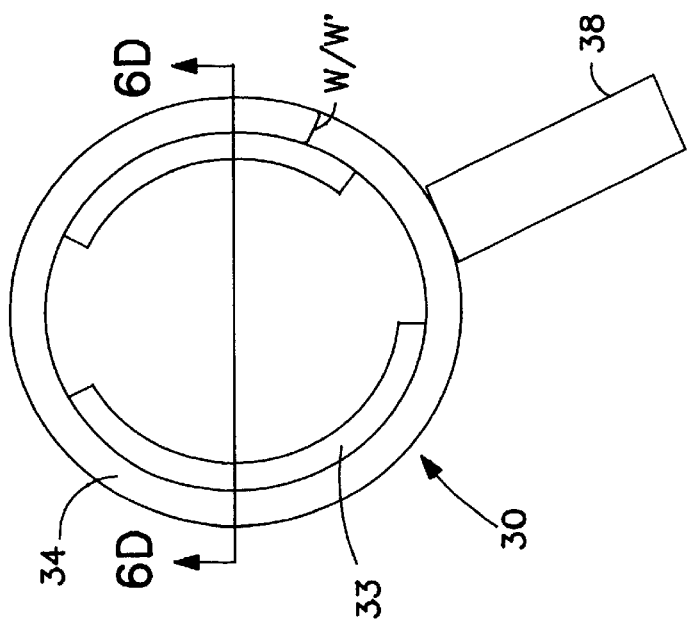
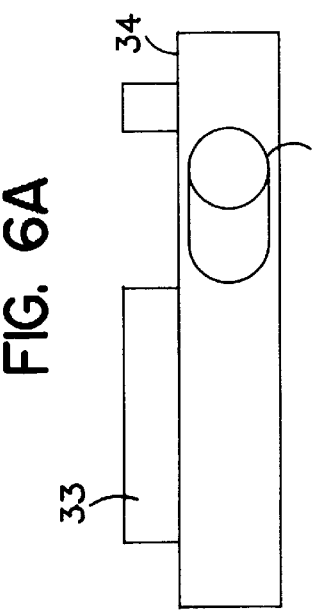
FIG. 6C
FIG. 6D
FIG. 6A
FIG. 6B ical hub device is disclosed in U.S. Pat. No.
LOCKING HUB

FIELD OF THE INVENTION

The present invention relates generally to a locking hub suitable for use with two articulating members attached thereto such that the articulating members are securably held in a given position until that position is changed by manipulation of the hub.

BACKGROUND OF THE INVENTION

Whenever structural support elements are desired to be rotatable about an axis such that these elements may be moved into any given position relative to each other and to the device to which they are attached, a locking hub is often employed to lock the elements into the desired position.

A typ4,059,285 to McCoy entitled "Home Shopping Cart" and issued Nov. 22, 1977. This device comprises a first dovetailed element to be withdrawn from engagement with a second, matingly dove-tailed element, so that the rotational angle between the elements may be adjusted and the assembly resecured.

A modification of the '285 device is described in European Pat. Pub. No. 0 339 890 to Hestair Maclaren Limited entitled "A Frame" and published Nov. 2, 1989. This device comprises a rotatable knob that enables the disengagement and re-engagement of matingly dovetailed elements similar to those of the '285 device.

These and other currently known locking hubs have several disadvantages. First, they are oftentimes unwieldy or difficult to operate. Second, many of the hubs currently known are not reliable in their operation (i.e., the "locked" elements can automatically release when under the forces generated during use). Third, such known hubs do not allow the rotational adjustment of only one articulating member or, if they do, this is accomplished by releasing all of the articulating members and holding those not to be adjusted in position, whilst adjusting the desired member.

SUMMARY OF THE INVENTION

Accordingly, it is an object of this invention to overcome the above illustrated inadequacies and problems of extant devices by providing a lockable hub device that is lightweight, simple to use, and reliable.

It is another object of this invention to provide a lockable hub device that enables the rotational adjustment of only one articulating member independently of the remaining structure.

It is a further object to provide a lockable hub device that enables quick, easy, and reliable readjustment and locking of the attached articulating members.

The foregoing objects are met by a lockable hub device having a base that accommodates about a central axis a ganged pair of lockable attachment rings, a corresponding pair of locking and release elements, and a top cap, the entire assembly being secured by means of an assembly element that engages both the base and the top cap. The articulating members to be adjusted, e.g., the legs of a table or other foldable device, are attached to one of the lockable attachment rings. For simplicity of use, it is intended that each of the locking and release elements be constructed to extend partly through lumens defined by the top cap such that they may lockably engage the cap while retaining their partial extension therethrough, and such that release of each element may be achieved in a similar fashion as the locking operation.

Other objects, features and advantages will be apparent from the following detailed description of preferred embodiments thereof taken in conjunction with the accompanying drawings in which:

BRIEF DESCRIPTION OF THE DRAWINGS

FIG. 6A is a plan view of an embodiment of the first lockable attachment ring of the present invention;

FIG. 6B is a front elevation of an embodiment of the first lockable attachment ring of the present invention;

FIG. 6C is a transparent perspective view of an embodiment of the first lockable attachment ring of the present invention;

FIG. 6D is a side elevation of an embodiment of the first lockable attachment ring of the present invention;

DETAILED DESCRIPTION OF EMBODIMENTS

Figure 1:
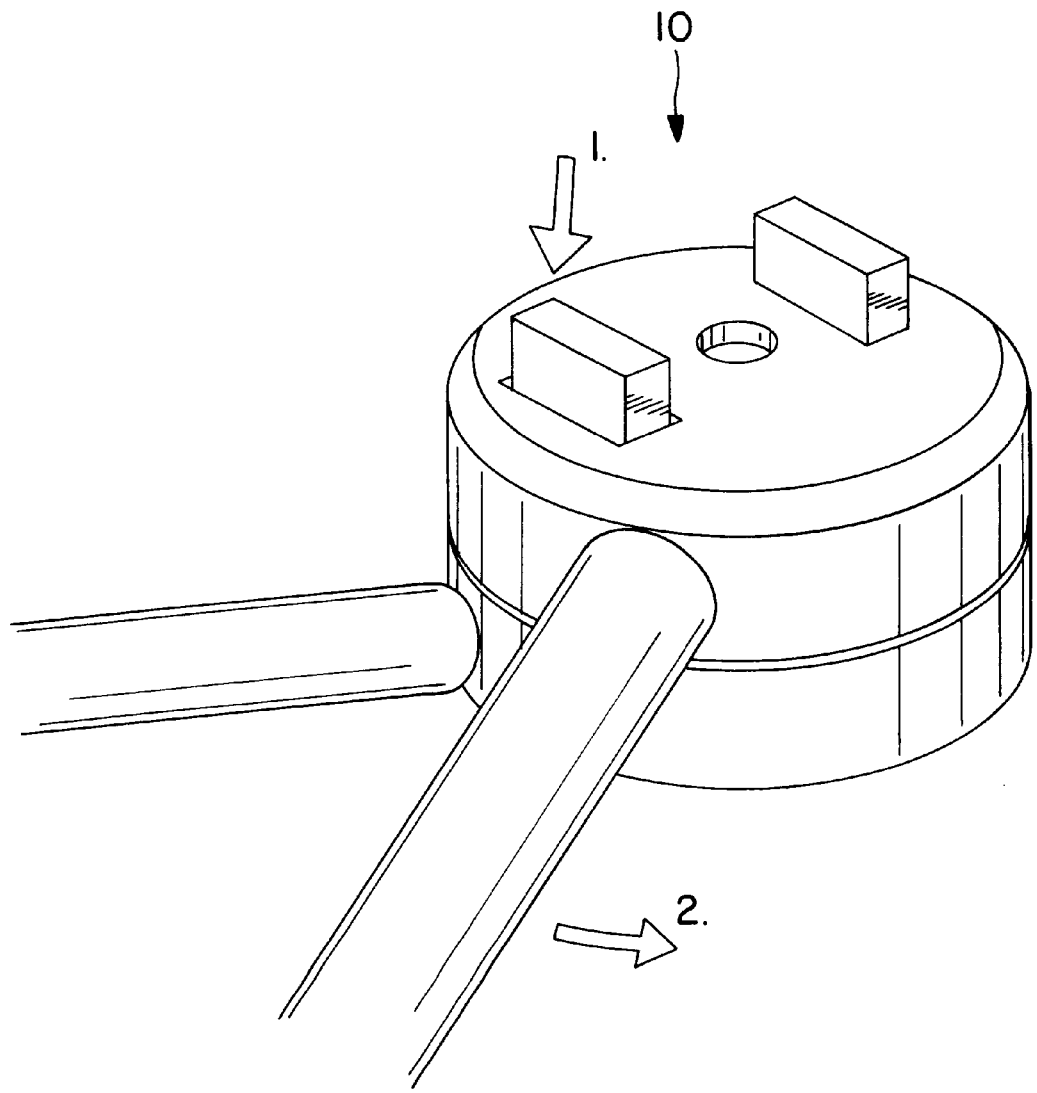
FIG. 1 is a perspective view of an embodiment of the lockable hub assembly of the present invention.
Figure 2:
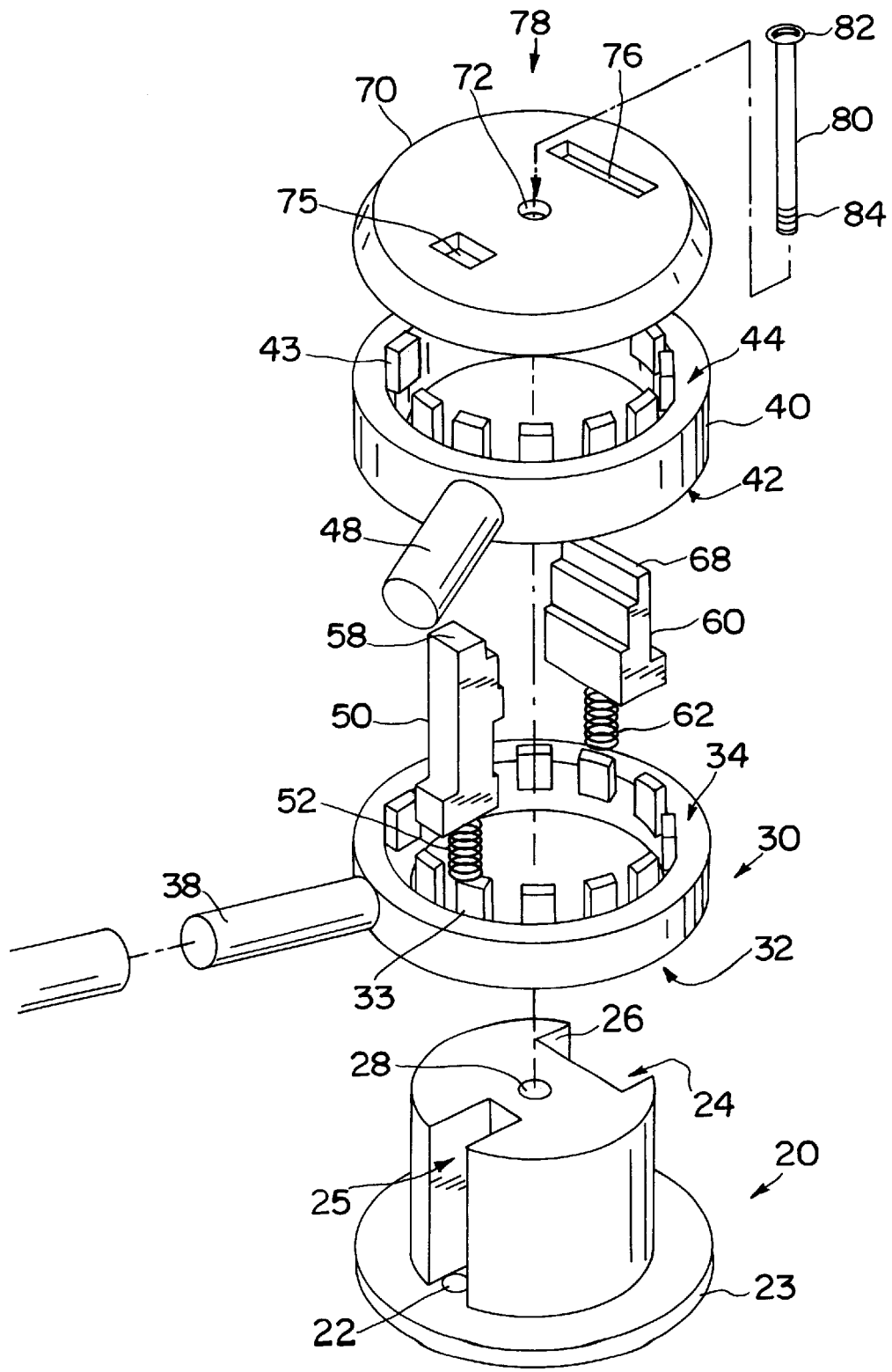
FIG. 2 is an exploded perspective view of a first embodiment of the lockable hub assembly of the present invention.
Figure 3:
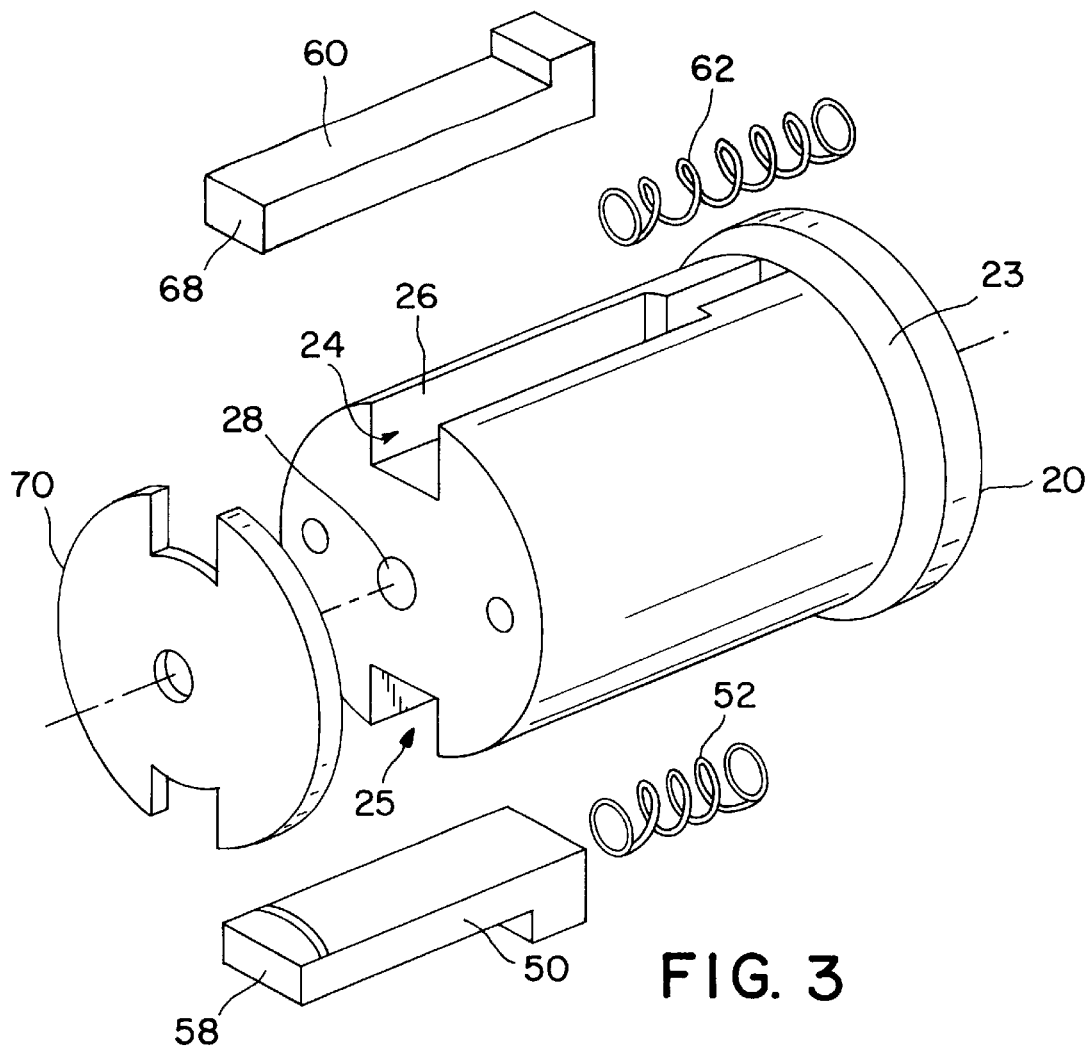
FIG. 3 is an exploded perspective view of a second embodiment of the lockable hub assembly of the present invention.
Figure 4:
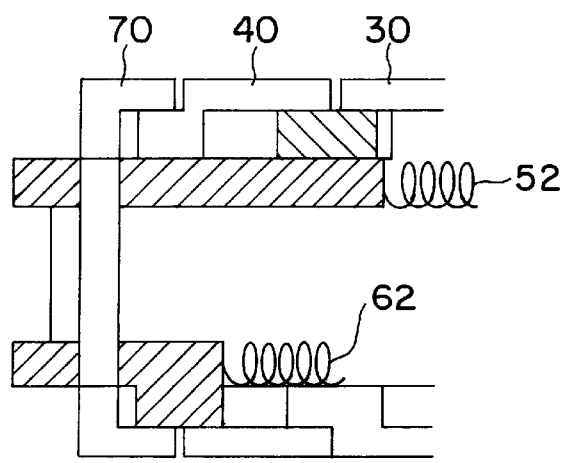
FIG. 4 a longitudinal cross-sectional elevation of a first embodiment of the lockable hub assembly of the present invention.
Figure 5B:
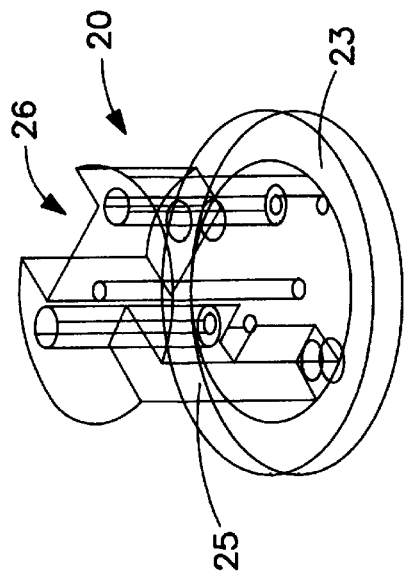
FIG. 5B is a transparent perspective view of an embodiment of the base element of the present invention.
Figure 5D:
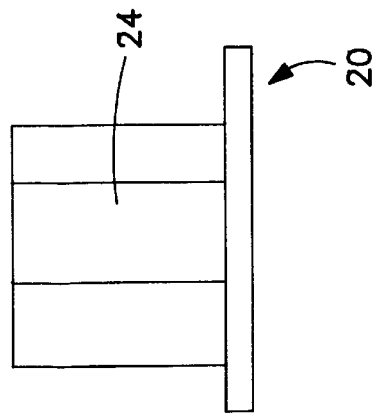
FIG. 5D is a side elevation of an embodiment of the base element of the present invention showing a second lateral groove.
Figure 5A:
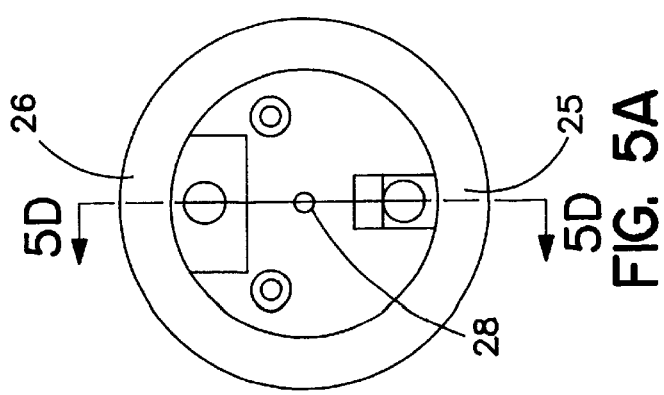
FIG. 5A is a plan view of an embodiment of the base element of the present invention.
Figure 5C:
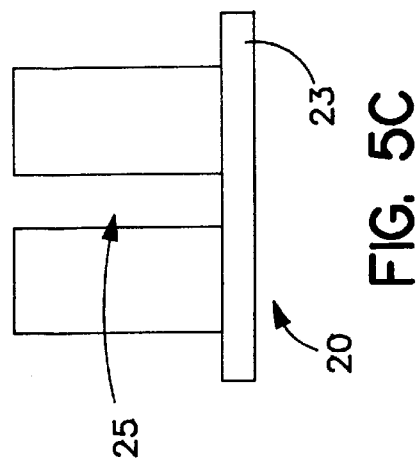
FIG. 5C is a side elevation of an embodiment of the base element of the present invention showing a first lateral groove.
Figure 7D:
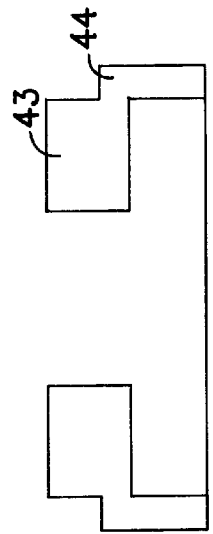
FIG. 7D is a side elevation of an embodiment of the second lockable attachment ring of the present invention.
Figure 7C:
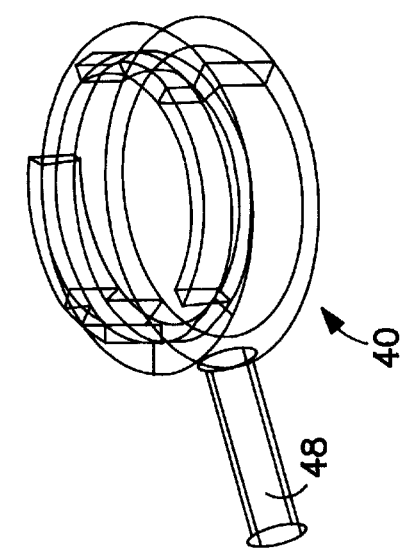
FIG. 7C is a transparent perspective view of an embodiment of the second lockable attachment ring of the present invention.
Figure 7A:
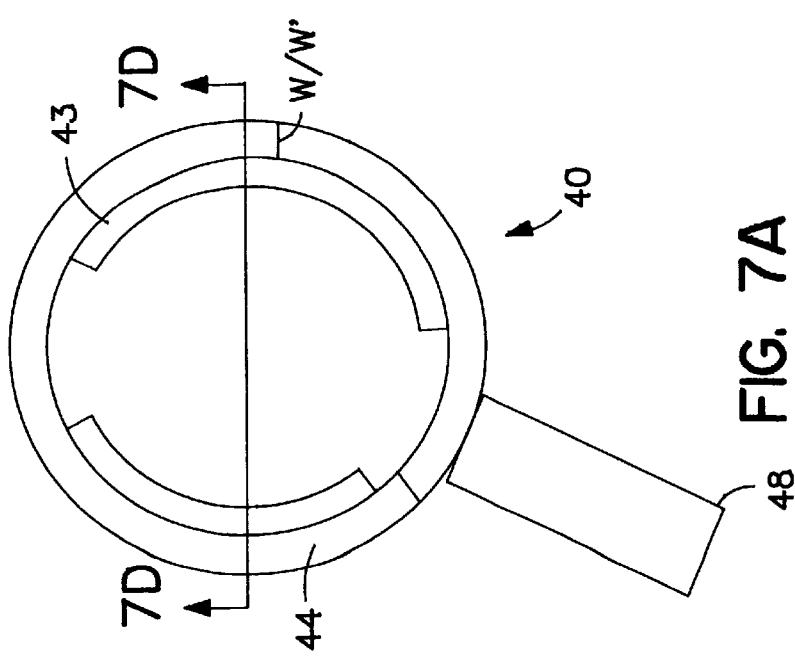
FIG. 7A is a plan view of an embodiment of the second lockable attachment ring of the present invention.
Figure 7B:
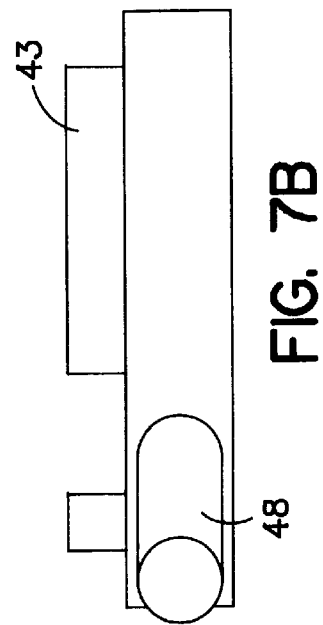
FIG. 7B is a front elevation of an embodiment of the second lockable attachment ring of the present invention.
Figure 8A:
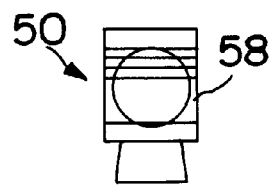
FIG. 8A is a plan view of an embodiment of the first locking and release element of the present invention.
Figure 8C:
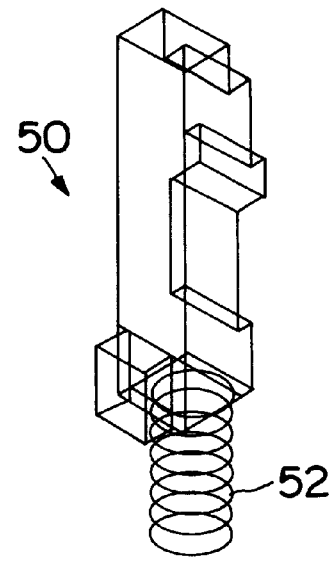
FIG. 8C is a transparent perspective view of an embodiment of the first locking and release element of the present invention.
Figure 8B:
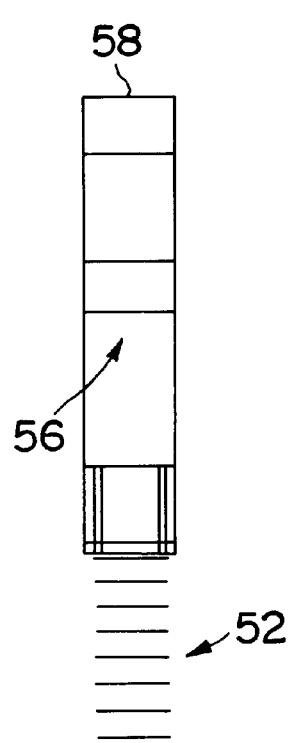
FIG. 8B is a front elevation of an embodiment of the first locking and release element of the present invention.
Figure 8D:
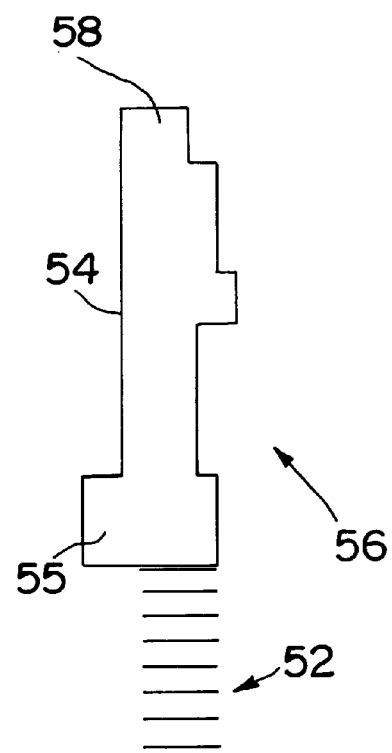
FIG. 8D is a side elevation of an embodiment of the first locking and release element of the present invention showing the position adjustment steps.
Figure 9A:
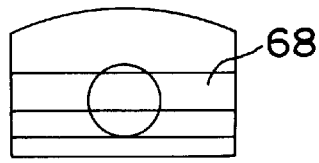
FIG. 9A is a plan view of an embodiment of the second locking and release element of the present invention.
Figure 9C:
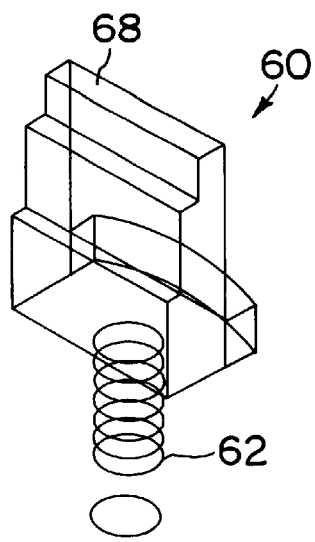
FIG. 9C is a transparent perspective view of an embodiment of the second locking and release element of the present invention.
Figure 9B:
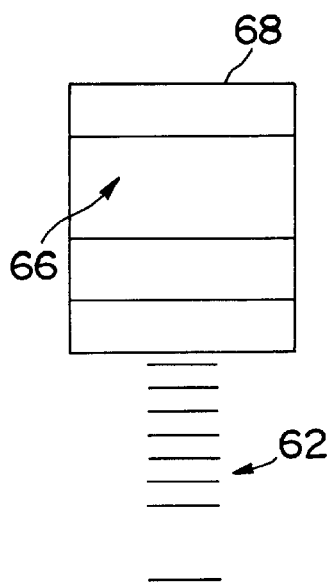
FIG. 9B is a front elevation of an embodiment of the second locking and release element of the present invention.
Figure 9D:
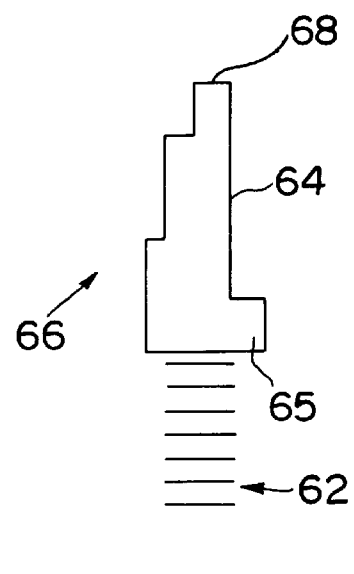
FIG. 9D is a side elevation of an embodiment of the second locking and release element of the present invention showing the position adjustment steps.
Figure 10B:
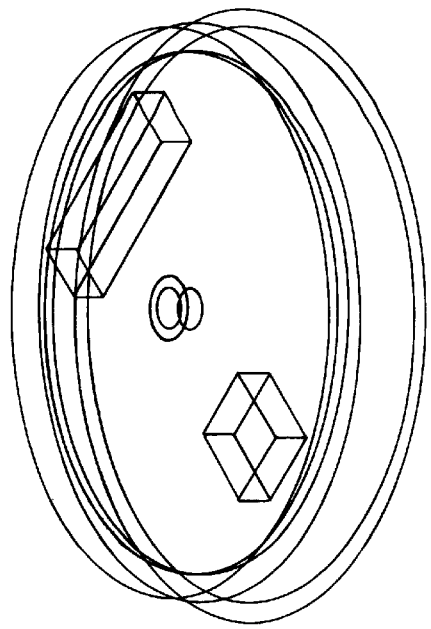
FIG. 10B is a transparent perspective view of an embodiment of the top cap of the present invention.
Figure 10A:
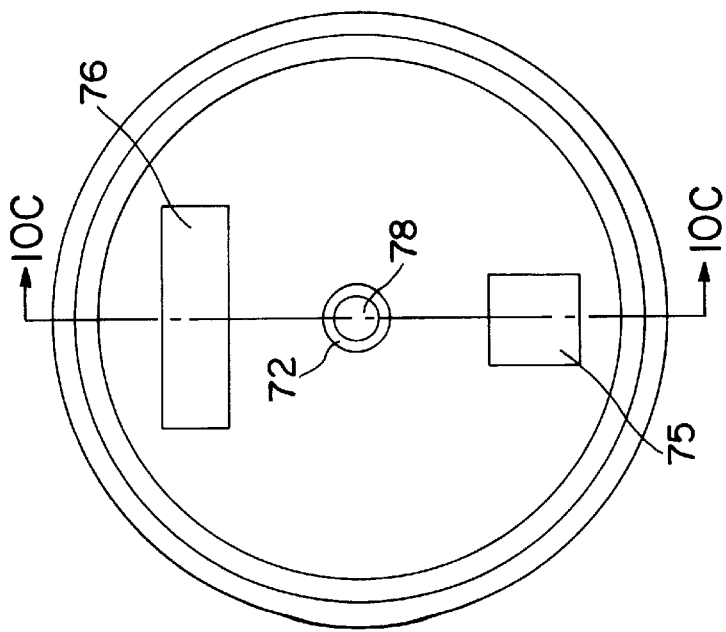
FIG. 10A is a plan view of an embodiment of the top cap of the present invention.
Figure 10C:
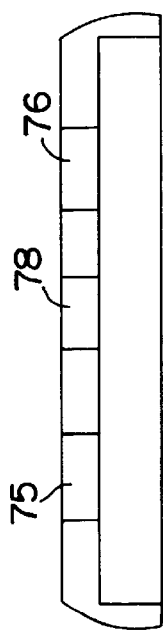
FIG. 10C is a side elevation of an embodiment of the top cap of the present invention showing the position adjustment steps.

In its simplest form, as shown in FIGS. 1–4, the present invention is a lockable hub assembly 10 comprising a base 20, a first lockable attachment ring 30, a second lockable attachment ring 40, a first locking and release element 50, a second locking and release element 60, a top cap 70, and an assembly element 80.

Base 20 comprises an essentially solid cylinder defining a central lumen 28 of sufficient diameter to accommodate assembly element 80. Base 20 further defines a first lateral groove 25 of sufficient depth and diameter to accommodate first locking and release element 50 and a second lateral groove 26, disposed opposite said first lateral groove 25, of sufficient depth and diameter to accommodate second locking and release element 60. Base 20 further comprises a terminal flange 23 of sufficient diameter to laterally support said first and second lockable attachment rings 30 and 40. Terminal flange may further define recesses 22 and 24 in alignment with said first and second lateral grooves 25 and 26, respectively. It is intended that recesses 22 and 24 can accommodate locking and release element biasing elements 52 and 62 in order to prevent the migration of said biasing elements 52 and 62 during operation or manipulation of the hub.

It is contemplated that base 20 may be constructed out of a solid cylinder of material into which are tooled said central lumen and said lateral grooves, or that a hollow base defining the same features may be forged, molded, or otherwise formed.

First and second lockable attachment rings 30 and 40, respectively, each define a central lumen sufficient to accommodate the diameter of base 20 such that said first and second lockable attachment rings 30 and 40 may be rotatable journaled thereon. Each of said first and second lockable attachment rings 30 and 40 further define a first face 32 and 42, respectively, having a width W that is essentially smooth and a second face 34 and 44, respectively, having a width W' that is also essentially smooth and that is provided with a plurality of crenelations 33 and 43, respectively, disposed such that they protrude into the central lumen substantially above the plane of second faces 34 and 44, respectively. It is intended that first face 32 slidably abut terminal flange 23 and that first face 32 slidably abut second face 34 such that both first and second lockable attachment rings 30 and 40 are capable of free 360° rotation about base 20. Finally, it is contemplated that each of first and second lockable attachment rings 30 and 50 may define at least one radially protruding element 38 and 48, respectively, to allow radial attachment thereto of a structural or functional element.

First and second locking and release elements 50 and 60, respectively, are elongate members having a first, external face 54 and 64, respectively, that are relatively planar throughout their longitudinal length, with the exception of crenelation engagement protrusions 55 and 65, respectively, disposed toward the base end of said locking and release elements, and a second, internal face 56 and 66, respectively, provided with a plurality of positioning rachets.

Top cap 70 defines a central lumen 78 of sufficient diameter to accommodate assembly element 80. It is contemplated that central lumen 78 may be defined within a recess 72 of sufficient conformation to recessably accommodate flange 82 of assembly element 80. Top cap 70 further defines first and second lumens 75 and 76 of sufficient geometry as to accommodate the entire radial cross-sectional area of terminal ends 58 and 68 of said first and second locking and release elements 50 and 60, respectively.

Assembly element 80 is an elongate element capable of securing an assembly of the above-recited elements. In one embodiment, it is contemplated that assembly element 80 comprise a bolt having a first, flanged end 82 and a second end 84 defining a threaded portion capable of securely engaging a complementarily threaded portion of lumen 28 or of a conventional nut element. Other, suitable fastening elements, such as the arrowhead type that allows assembly, but not disassembly, are contemplated.

In the assembled device, it is contemplated that each of first and second locking and release elements 50 and 60 be disposed within first and second lateral grooves 25 and 26, respectively, in linear alignment with biasing elements 52 and 62, which may be further disposed within recesses 22 and 24, respectively. First and second lockable attachment rings 30 and 40 are intended to be journalled on base 20 such that they slidably nest with each other and also slidably retain first and second locking and release elements 50 and 60 axially within their respective lateral grooves. It is finally intended that top cap 70 be fitted over the remainder of the assembly such that ends 58 and 68 of first and second locking and release elements 50 and 60 protrude through first and second lumens 75 and 76 of top cap 70 such that ends 58 and 68 are accessible to an operator.

In operation, it is contemplated that the normal condition of the hub will be to have both lockable attachment rings 30 and 40 locked in a selected position. To change the angular rotation of either or both of lockable attachment rings 30 and 40, an operator would first axially depress protruding end 58 and/or 68 of first and/or second locking and release element 50 and 60 with sufficient force to overcome the biasing force of biasing elements 52 and/or 62 such that the respective positioning rachet of first and/or second locking and release element 50 and 60 slidably or otherwise engages top cap 70. In this rachet-engaged position, crenelation engagement protrusions 55 and/or 65 are disengaged from crenelations 33 and/or 43, thereby allowing the free, slidable rotation of lockable attachment rings 30 and 40.

When the newly desired angular position of radially protruding element 38 and/or 48 is attained, protruding end 58 and/or 68 of first and/or second locking and release element 50 and/or 60 may be radially biased with sufficient force to disengage the respective positioning rachet of first and/or second locking and release element 50 and 60 from slidable or otherwise engagement with top cap 70 and, simultaneously due to the biasing force of biasing elements 52 and/or 62, reengagement of crenelation engagement protrusions 55 and/or 65 with crenelations 33 and/or 43, thereby again locking lockable attachment rings 30 and 40 into position.

It is also contemplated that the reverse condition of first and second locking and release elements 50 and 60 may be employed, i.e., that the position of positioning rachet engagement with top cap 70 be considered the locked position, and the position of positioning rachet disengagement with top cap 70 be considered the unlocked position. It is understood that this reverse condition is made possible by relocation of crenelation engagement protrusions 55 and 65 along internal face 56 and 66, respectively.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

I claim:

1. A lockable hub device comprising:
   a) a base having a central axis, longitudinal support means about said axis defining a central lumen and at least one radially disposed lateral groove, and terminal lateral support means,
   b) at least one lockable attachment ring having an upper ring surface, a lower ring surface and a smooth interior ring surface defined by said upper and lower ring surfaces and further defining a first interior diameter, said at least one lockable attachment ring further having crenellated projections extending upwardly from said upper ring surface and axially past said interior ring surface such that said crenellated projections further define a second, lesser interior diameter,
   c) at least one locking and release element,
   d) a top cap, and
   e) and an assembly element,
   wherein said base is capable of accommodating about said central axis said at least one lockable attachment ring such that said at least one lockable attachment ring is retained by said longitudinal support means, said terminal lateral support means, and said top cap and wherein said base further is capable of accommodating within said at least one radially disposed lateral groove said at least one locking and release element, such that said at least one locking and release element is retained within said at least one radially disposed lateral groove by means of said at least one lockable attachment ring and further such that said locking and release element is capable of engaging said at least one lockable attachment ring by means of said projections, the entire assembly being secured by engagement of said assembly element with both said base and said top cap.

2. The lockable hub, as claimed in claim 1, wherein said at least one lockable attachment ring is provided with means for accommodating at least one articulating member to be adjusted.

3. The lockable hub, as claimed in claim 1, wherein said terminal lateral support means further defines at least one recess in alignment with said at least one radially disposed lateral groove such that said at least one recess can accommodate at least one locking and release element biasing element in order to prevent the migration of said at least one locking and release element during operation or manipulation of the hub.

4. The lockable hub, as claimed in claim 1, wherein said at least one locking and release element is an elongate member having a base end and a manipulation end, a first, external face that is relatively planar throughout the longitudinal length thereof and at least one lockable attachment ring engagement protrusion disposed toward said base end, and a second, internal face provided with a plurality of positioning ratchets.

5. The lockable hub, as claimed in claim 1, wherein said at least one lockable attachment ring defines a central lumen sufficient to accommodate the diameter of said base such that said at least one lockable attachment ring may be rotatably journaled thereon.

6. The lockable hub, as claimed in claim 5, wherein said at least one lockable attachment ring further defines a first face that is essentially smooth and a second face disposed approximately 90° from said first face that is essentially smooth toward the periphery and thereof, said at least one lockable attachment ring being provided with a plurality of crenellations extending into said central lumen, so that said first face abuts said terminal lateral support means and said second face abuts the next stacked element such that said at least one lockable attachment ring is capable of free 360° rotation about said base.

7. The lockable hub, as claimed in claim 6, wherein said at least one lockable attachment ring is provided with means for accommodating at least one articulating member to be adjusted.

8. The lockable hub, as claimed in claim 1, wherein said terminal lateral support means further defines at least one recess in alignment with said at least one radially disposed lateral groove such that said at least one recess can accommodate elements capable of longitudinally biasing said at least one locking and release element.

9. The lockable hub, as claimed in claim 7, wherein said at least one articulating member to be adjusted is a structural or functional element.

10. The lockable hub, as claimed in claim 6, wherein said at least one locking and release element is an elongate member having a base end and a manipulation end, a first, external face that is relatively planar throughout the longitudinal length thereof and at least one lockable attachment ring engagement protrusion disposed toward said base end, and a second, internal face provided with a plurality of positioning ratchets, such that said at least one locking and release element is capable of alternating between a first, engaged position wherein said lockable attachment ring engagement protrusion engages said plurality of crenelations and a second, non-engaged position wherein said lockable attachment ring engagement protrusion does not engage said plurality of crenelations.

* * * * *